United States Patent [19]

Fujishima

[11] 4,403,244
[45] Sep. 6, 1983

[54] APPARATUS FOR CORRECTING A VARIATION IN THE TIME BASE OF A REPRODUCED VIDEO SIGNAL

[75] Inventor: Tooru Fujishima, Yokohama, Japan

[73] Assignee: Hitachi, Ltd., Tokyo, Japan

[21] Appl. No.: 231,924

[22] Filed: Feb. 5, 1981

[30] Foreign Application Priority Data

Feb. 6, 1980 [JP] Japan .................. 55-12439

[51] Int. Cl.³ ........................................... H04N 5/785
[52] U.S. Cl. ..................................... 358/19; 358/325; 358/324
[58] Field of Search ................. 358/19, 4, 8, 320, 323, 358/324, 325, 327, 337; 360/36.1

[56] References Cited

U.S. PATENT DOCUMENTS

| | | | |
|---|---|---|---|
| 3,619,491 | 11/1971 | Fujita | 358/19 |
| 3,758,710 | 9/1973 | Grosno | 360/36.1 |
| 3,758,711 | 9/1973 | Grosno | 360/36.1 |
| 3,921,202 | 11/1975 | Dann | 358/8 |
| 4,057,826 | 11/1977 | Baker | 358/8 |
| 4,099,204 | 7/1978 | Lowe | 358/8 |
| 4,145,705 | 3/1979 | Yoshinaka | 358/19 |
| 4,228,460 | 10/1980 | Rotter | 358/320 |

*Primary Examiner*—Tommy P. Chin
*Attorney, Agent, or Firm*—Antonelli, Terry & Wands

[57] ABSTRACT

An apparatus suited for correcting a variation in the time base of a reproduced signal in a video disc player comprises a frequency converter circuit for converting the frequency of the reproduced signal, a first time base compensating (APC) system including an automatic phase control loop for varying the frequency of the reproduced signal by controlling the phase of a converting signal supplied to the frequency converter circuit in dependence on a phase difference between the reproduced signal and a reference signal, and a second time base compensating system including a variable delay element controlled in dependence on a phase difference between the reproduced signal and the reference signal. Variation in the time base remaining uncorrected in the first compensating system is compensated by the second compensating system including the variable delay element.

6 Claims, 6 Drawing Figures

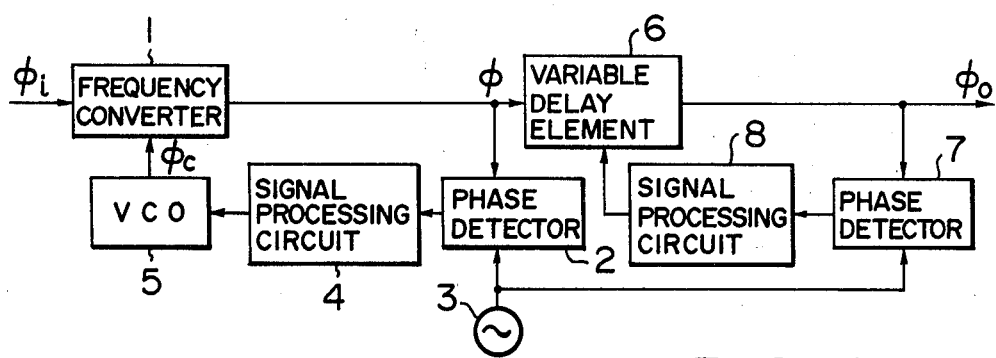
FIG. 1
FIG. 4
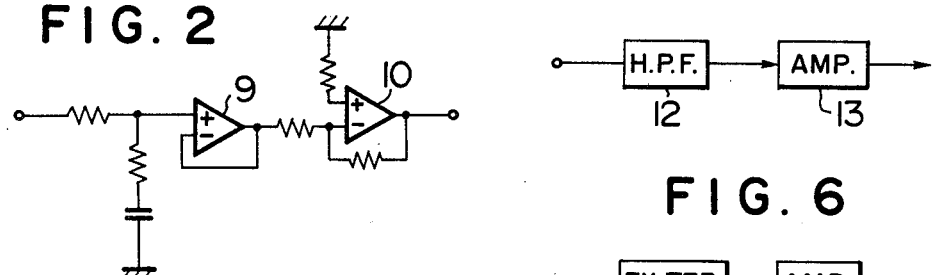
FIG. 2
FIG. 6
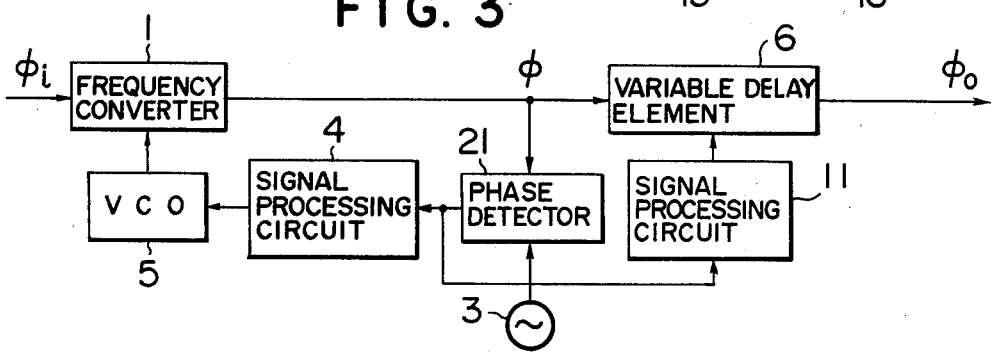
FIG. 3
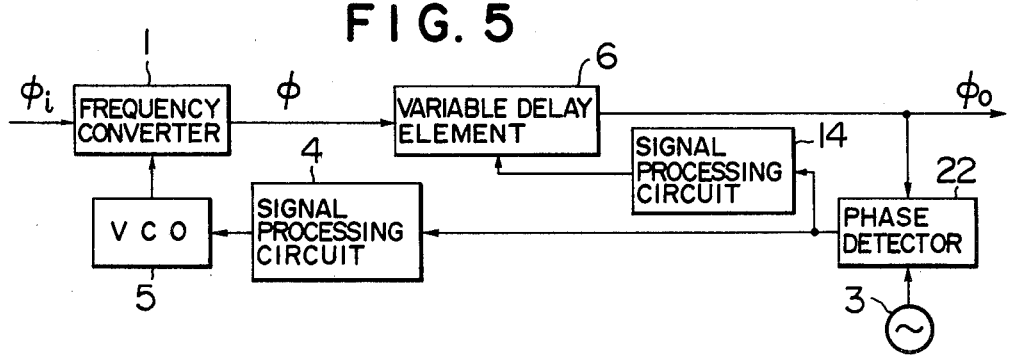
FIG. 5

APPARATUS FOR CORRECTING A VARIATION IN THE TIME BASE OF A REPRODUCED VIDEO SIGNAL

BACKGROUND OF THE INVENTION

The present invention relates to an apparatus for correcting a variation in the time base of a reproduced signal, which apparatus is suited for use in a system for reproducing recorded data or an information signal from a recording medium. In particular, the invention concerns an apparatus for correcting a variation in the time base of a reproduced color video signal, which apparatus is suited for use in a system for reproducing a color video signal from a recording medium such as a video disc.

As a typical example of a system for reproducing a color video signal from a recording medium on which the color video signal is recorded, there is known a video disc play-back apparatus in which a rotatable disc-like recording medium generally is used. Information signals or color video signal is recorded on the disc along a spiral track after having been modulated in an appropriate manner and is read out by means of a detecting head.

Usually, a carrier signal is modulated by the information or data signal and the recording on the video disc is made in the form of a series of concave and convex recesses termed "pits". For reproduction, there are known a system for reading out the recorded information as changes in an electrostatic capacitance by means of a stylus and a system in which the video disc is irradiated by a laser ray and the recorded information is read out as changes in the intensity of reflected or transmitted light. The video disc is rotated by a drive motor whose speed is controlled so that the disc is rotated in a stable manner. However, because of the inevitable tolerance or dimensional error of the center hole of the disc as well as a discrepancy between the center of disc and the center of rotation at the coupling between the disc and the rotating means, the video disc often is rotated necessarily with a slight eccentricity. The rotation of the disc in the eccentric state as well as variation in the speed of rotation of the drive motor which is inevitable even when the drive motor is controlled so as to be rotated in a stable manner and deformation of the spiral track will give rise to variation in the time base of the reproduced.

Such variation in the time base of the reproduced signal has heretofore been corrected by detecting the variation and correspondingly displacing the detector head for reading out the information relative to the disc. Additionally, in conjunction with the frequency conversion which is usually effected for processing the picked-up signal, correction or compensation of the variation in the time base is performed by using an automatic phase control or APC loop.

In these controls described above, a signal representative of variation in the time base is derived from a color burst signal and a horizontal synchronizing signal contained in the reproduced signal. Consequently, the control is a so-called sample control performed at a horizontal frequency of about 16 KHz. Besides, since the APC loop includes a voltage controlled oscillator or VCO, difficulty is encountered in increasing sufficiently the open loop gain of the APC loop for a frequency higher than about 500 Hz. This can be explained by the fact that the loop including the VCO necessarily contains an integrating factor (1/s) which provides a cause for an attenuation of the signal amplitude (−6 dB/octave).

Under the circumstances, when a variation in the time base occurs beyond an allowable level in a frequency range higher than about 500 Hz for various reasons inclusive of distortion involved in the recording on the disc, it becomes very difficult to correct or compensate such time base variation. As a consequence, a reproduced picture suffers color phase irregularity to a serious disadvantage.

SUMMARY OF THE INVENTION

An object of the invention is to provide an apparatus for correcting or compensating a variation in the time base of a reproduced video signal in which the loop gain can be increased in a relatively high frequency range so that the variation in the time base of the signal having a high frequency can be easily suppressed.

With a view to accomplishing the object described above, it is proposed according to the teaching of the invention that correction or compensation of variation in the time base which is performed with the aid of a variable delay element is provided in addition to the correction of variation in the time base effected by the APC loop. For controlling the variable delay element, either means for detecting the time base variation independently or a phase comparator circuit constituting a part of the APC loop is made use of for producing an error signal to be utilized for the control.

According to the invention, a satisfactory correction or compensation can be made for the time base variation of a signal having a frequency too high to be sufficiently corrected by the APC loop, since a high loop gain can be established even at such high frequencies. The invention may be advantageously applied to a color processing circuit of the video disc play-back apparatus to reproduce a color video signal of high quality.

BRIEF DESCRIPTION OF THE DRAWINGS

FIG. 1 shows in a block diagram an exemplary embodiment of the invention.

FIG. 2 is a circuit diagram showing an exemplary arrangement of a signal processing circuit (8) used in the apparatus shown in FIG. 1.

FIG. 3 shows in a block diagram another embodiment of the apparatus according to the invention.

FIG. 4 is a block diagram to show an exemplary arrangement of a signal processing circuit (11) used in the apparatus shown in FIG. 3.

FIG. 5 is a block diagram showing still another embodiment of the invention.

FIG. 6 is a block diagram to illustrate an exemplary arrangement of a signal processing circuit (14) used in the apparatus shown in FIG. 5.

DESCRIPTION OF THE PREFERRED EMBODIMENTS

FIG. 1 shows an exemplary embodiment of the present invention, wherein the invention is applied to a circuit destined for processing color signal components of a color video signal. In FIG. 1, reference numeral 1 denotes a frequency converter circuit, and 2 denotes a phase detector circuit or phase comparator circuit for comparing the phase of an output signal $\phi$ from the frequency converter circuit 1 with that of an output signal from a reference signal generator 3. The phase comparator circuit includes a burst gate and an automatic amplitude regulating stage. Reference numeral 4 denotes a signal processing circuit for processing an error signal resulting from the phase comparison effected by the phase comparator 2. The signal processing circuit 4 includes a filter and an amplifier stage. Numeral 5 denotes a voltage controlled oscillator. The frequency converter circuit 1 serves to convert the frequency of the reproduced color signal to a frequency which is identical with that of the standard color television signal, because a color signal to be reproduced has been recorded with a frequency which is different from that of the standard color television signal.

The frequency converter circuit 1, the phase comparator circuit 2, the reference signal generator 3, the signal processing circuit 4 and the voltage controlled oscillator 5 constitute a so-called APC-system. The burst signal contained in the output signal $\phi$ from the frequency converter circuit 1 is compared with the output signal from the reference signal generator 3 in respect of phase through the phase comparator 2, whereby the error signal resulting from the phase comparison is supplied to the voltage controlled oscillator (VCO) 5 through the signal processing circuit 4. As consequence, the voltage controlled oscillator or VCO 5 is controlled in dependence on variation in the time base of the output signal $\phi$, resulting in the frequency of the output signal $\phi_c$ from the VCO 5 being correspondingly changed. The output signal $\phi_c$ from the VCO 5 is then supplied to the frequency converter circuit 1 to be utilized for suppressing the variation in the time base of an input signal $\phi_i$.

Since the variation in the time base of a high frequency signal cannot be sufficiently corrected or compensated solely with the aid of the APC-system, as described hereinbefore, the output signal $\phi$ is further subjected to correction exerted by a variable delay element 6. The control of the delay time brought about by the variable delay element 6 is effected by a signal which is derived from the phase comparison of the output signal $\phi_o$ with the output signal from the reference signal generator 3 through a phase detector or phase comparator circuit 7 and processed by a signal processing circuit 8. The phase comparator circuit 7 is also composed of a burst gate and a phase shifter stage.

The variable delay element 6 may be constituted by a delay circuit which includes a plurality of inductors connected in series to one another and a number of variable capacitance diodes connected between the junctions of the inductors and a reference potential point, for example. An output signal of the signal processing circuit 8 is applied to the variable capacitance diodes. Further, a charge-coupled device (CCD) or the like may be employed to this end.

The signal processing circuit 8 may be implemented in a circuit configuration illustrated in FIG. 2, for example. In this figure, reference numeral 9 denotes a voltage follower circuit having a gain of 1 and exhibiting a high input impedance and a low output impedance. Numeral 10 denotes an operational amplifier. By way of example, typical frequencies $f_i$, $f_c$ and $f_o$ corresponding to the input signal $\phi_i$, the output signal $\phi_c$ from the VCO 5 and the output signal $\phi_o$, respectively, may be as follows:

$f_i = 1.53$ MHz $f_c = 5.11$ MHz $f_o = |f_c - f_i| = 3.58$ MHz

The circuit arrangement according to the invention described so far will allow the reproduced output signal to be obtained with little variation in phase by virtue of the feature that the variation in the time base which has not been removed by the APC system can be corrected or compensated by the variable delay element 6. It should further be noted that the system constituted by the variable delay element 6, the phase comparator circuit 7 and the signal processing circuit 8 contains no voltage controlled oscillator and thus suffers from no amplitude attenuation which is ascribable to an integrating factor (1/s). Consequently, the loop gain can be easily established even in a high frequency range, whereby phase variation of the order of 500 Hz can be positively suppressed.

FIG. 3 shows a second embodiment of the invention. In the figure, those components or elements which serve for the same functions as those shown in FIG. 1 are denoted by like reference numerals. Numeral 11 denotes a signal processing circuit. The second embodiment shown in FIG. 3 differs from the first embodiment in that the phase comparator circuit 7 is eliminated and that the control of the variable delay element 6 is implemented in a so-called follower loop without feedback. More particularly, the control of the delay time of the variable delay element 6 is effected by making use of the signal derived by processing the very output signal produced from a phase detector or phase comparator circuit 21 constituting a part of the APC loop. An example of the signal processing circuit 11 employed to this end may be composed of a high-pass filter 12 and an amplifier 13, as is shown in FIG. 4.

A third exemplary embodiment of the invention is illustrated in FIG. 5. In the case of this embodiment, the phase comparator circuit 7 of the first embodiment shown in FIG. 1 is eliminated as in the case of the second embodiment shown in FIG. 3. The control of the variable delay element 6 is implemented in a parallel control configuration. The output signal $\phi_o$ is compared with the signal produced from the reference signal generator 3 through a phase detector or phase comparator 22. The output signal from the phase comparator 22 is processed by the signal processing circuit 14, the output signal from which is then utilized for controlling the delay provided by the variable delay element 6, whereby possible variation in phase of the output signal $\phi$ from the APC loop constituted by the frequency converter circuit 1, the phase comparator circuit 22, the reference signal generator 3, the signal processing circuit 4 and the voltage controlled oscillator 5 is further compensated. In this manner, the output signal $\phi_o$ having substantially no variation in the time base can be obtained.

The signal processing circuit 14 may be composed of a filter 15 and an amplifier 16, as is shown in FIG. 6. When the open-loop gain of the loop which includes the signal processing circuit 4 is represented by $G_1$, while open-loop gain of the loop containing the signal processing circuit 14 is represented by $G_2$, then the relation between the phase deviations $\Delta\phi_o$ and $\Delta\phi_i$ of the output and input signals $\phi_o$ and $\phi_i$ is given by the following expression:

$$\Delta\phi_o = \frac{\Delta\phi_i}{1 + G_1 + G_2}$$

As will be appreciated from the foregoing description, even when difficulty is encountered in suppressing variation in the time base because of a small loop gain $G_1$ of the APC loop for high frequencies, the loop including the variable delay element assures a high loop gain $G_2$ in the high frequency range, making it possible to suppress easily variation in the time base for the high frequencies.

When the invention is applied to a video disc playback apparatus, a reproduced picture image immune to color phase irregularity can be obtained.

I claim:

1. An apparatus for correcting a variation in the time base of a reproduced video signal for use in a system for reproducing a video signal recorded on a recording medium, comprising:
   frequency converting means responsive to a frequency converting signal for effecting frequency conversion of a signal read out from said recording medium;
   a voltage controlled oscillator for supplying said frequency converting signal to said frequency converting means, the frequency of said frequency converting signal being adapted to be controlled by a first control signal;
   reference signal generator means for producing a reference signal of a fixed frequency;
   phase comparator means for phase comparing a reproduced signal derived from said frequency converting means with said reference signal to thereby produce an error signal;
   means for supplying said first control signal to said voltage controlled oscillator in dependence on said error signal;
   variable delay means for passing therethrough said reproduced signal derived from said frequency converting means, said variable delay means having a delay time controlled by a second control signal; and
   means for supplying the second control signal to said variable delay means in dependence on the phase difference between the output of said variable delay means and said reference signal.

2. An apparatus as set forth in claim 1, wherein said means for supplying the second control signal to said variable delay means includes a second phase comparator means for detecting the phase difference between the signal output from said variable delay means and said reference signal.

3. An apparatus as set forth in claim 2, wherein each of said phase comparator means is composed of a phase comparator circuit adapted for phase comparing a burst signal contained in the reproduced signal and the output of said variable delay means with said reference signal.

4. An apparatus for correcting a variation in the time base of a reproduced video signal for use in a system for reproducing a video signal recorded on a recording medium, comprising:
   frequency converting means responsive to a frequency converting signal for effecting frequency conversion of a signal read out from said recording medium;
   a voltage controlled oscillator for supplying said frequency converting signal to said frequency converting means, the frequency of said frequency converting signal being adapted to be controlled by a first control signal;
   reference signal generator means for producing a reference signal of a fixed frequency;
   phase comparator means for phase comparing a reproduced signal derived from said frequency converting means with said reference signal to thereby produce an error signal;
   means for supplying said first control signal to said voltage controlled oscillator in dependence on said error signal;
   variable delay means for passing therethrough said reproduced signal derived from said frequency converting means, said variable delay means having a delay time controlled by a second control signal; and
   means for supplying the second control signal to said variable delay means in dependence on said error signal.

5. An apparatus as set forth in claim 4, wherein said phase comparator means comprises a phase comparator for phase comparing a burst signal contained in the reproduced signal with said reference signal.

6. An apparatus for correcting a variation in the time base of a reproduced video signal for use in a system for reproducing a video signal recorded on a recording medium, comprising:
   frequency converting means responsive to a frequency converting signal for effecting frequency conversion of a signal read out from said recording medium;
   a voltage controlled oscillator for supplying said frequency converting signal to said frequency converting means, the frequency of said frequency converting signal being adapted to be controlled by a first control signal;
   reference signal generator means for producing a reference signal of a fixed frequency;
   variable delay means for passing therethrough said reproduced signal derived from said frequency converting means, said variable delay means having a delay time controlled by a second control signal;
   phase comparator means for phase comparing the signal output of said variable delay means with said reference signal to thereby produce an error signal;
   means for supplying said first control signal to said voltage controlled oscillator in dependence on said error signal; and
   means for supplying the second control signal to said variable delay means in dependence on said error signal.

* * * * *